(12) United States Patent
Szepessy

(10) Patent No.: US 7,704,300 B2
(45) Date of Patent: Apr. 27, 2010

(54) DEVICE AND A METHOD FOR CLEANING OF A GAS

(75) Inventor: Stefan Szepessy, Huddinge (SE)

(73) Assignee: Alfa Laval Corporate AB (SE)

( * ) Notice: Subject to any disclaimer, the term of this patent is extended or adjusted under 35 U.S.C. 154(b) by 527 days.

(21) Appl. No.: 11/628,470

(22) PCT Filed: May 18, 2005

(86) PCT No.: PCT/SE2005/000732

§ 371 (c)(1),
(2), (4) Date: Dec. 1, 2006

(87) PCT Pub. No.: WO2005/119020

PCT Pub. Date: Dec. 15, 2005

(65) Prior Publication Data

US 2008/0264251 A1    Oct. 30, 2008

(30) Foreign Application Priority Data

Jun. 3, 2004  (SE) .................................... 0401423

(51) Int. Cl.
*B03C 3/011* (2006.01)
(52) U.S. Cl. ................ 95/69; 55/DIG. 18; 55/DIG. 19; 95/70; 95/77; 95/78; 96/55; 96/57; 96/61; 96/63; 96/94
(58) Field of Classification Search ...... 95/63, 95/69, 70, 78, 77; 96/55, 57, 61, 63, 74, 96/94; 55/DIG. 18, DIG. 19
See application file for complete search history.

(56) References Cited

U.S. PATENT DOCUMENTS

| 1,558,382 | A | * | 10/1925 | Marx | .......................... 204/545 |
| 2,667,942 | A | * | 2/1954 | Wintermute | .................... 96/61 |
| 2,740,493 | A | * | 4/1956 | Wintermute | .................... 95/64 |
| 2,867,285 | A | * | 1/1959 | Wintermute | .................... 96/18 |
| 3,443,362 | A | * | 5/1969 | Ebert | ............................. 96/50 |
| 4,046,527 | A | * | 9/1977 | Kistemaker | ...................... 96/3 |
| 4,649,703 | A | * | 3/1987 | Dettling et al. | ............... 60/275 |
| 5,380,355 | A | * | 1/1995 | Brothers | ......................... 96/64 |
| 6,090,184 | A | * | 7/2000 | Cartellone | ..................... 95/69 |
| 2003/0167922 | A1 | * | 9/2003 | Ike et al. | ......................... 96/66 |

FOREIGN PATENT DOCUMENTS

| DE | 297 14 203 U1 | 9/1997 |
| EP | 0685635 A1 | 12/1995 |
| EP | 1273335 A2 | 1/2003 |
| JP | 2078454 | 3/1990 |
| JP | 7308599 | 11/1995 |
| WO | WO2004/001201 | 12/2003 |
| WO | WO2004/022239 | 3/2004 |

* cited by examiner

*Primary Examiner*—Richard L Chiesa
(74) *Attorney, Agent, or Firm*—Michaud-Kinney Group LLP

(57) ABSTRACT

The invention refers to a device and a method for cleaning a gas containing particulate impurities. The device includes a main separator having an inlet for the gas, an outlet for the gas and a rotating member provided between the inlet and the outlet. The rotating member is adapted to bring the gas to rotate for separating by means of centrifugal forces a main amount of the particulate impurities from the gas, wherein a rest amount of the particulate impurities remains in the gas. The device also includes an additional separator adapted to separate substantially the whole rest amount. The additional separator includes an electrostatic filter.

29 Claims, 4 Drawing Sheets

DEVICE AND A METHOD FOR CLEANING OF A GAS

FIELD OF THE INVENTION

The present invention refers generally to cleaning of a gas through separation of particulate impurities from the gas. More specifically it is directed to the separation of oil particles, in the form of droplets or a mist, and/or solid particles from the gas. In particular the invention refers to cleaning of gases from a crankcase in a combustion engine and cleaning of air in various applications within the machine tool industry, for instance the air around various kinds of machine tools. Such gases and such air contain particulate impurities of different sizes. The invention refers however also to other applications where a gas needs to be cleaned from particulate impurities of different kinds and different sizes.

The present invention refers especially to a device for cleaning of a gas containing particulate impurities, wherein the device includes a main separator having an inlet for the gas, an outlet for the gas and a rotating member, which is arranged between the inlet and the outlet and includes a rotor spindle and a number of rotating separation discs attached to the rotor spindle, wherein the rotating member is adapted to bring the gas to rotate for separating by means of centrifugal forces a main amount of the particulate impurities from the gas, wherein a rest amount of the particulate impurities remains in the gas. The invention also refers to a method for cleaning a gas containing particulate impurities, including the steps of: supplying the gas to an inlet of a main separator, rotating the gas by means of a rotating member of the main separator, which includes a rotor spindle and a number of rotating separation discs attached to the rotor spindle, wherein the rotating member by means of centrifugal forces separates a main amount of the particulate impurities from the gas, wherein a rest amount of the particulate impurities remains in the gas, and discharging the gas from the main separator via an outlet.

BACKGROUND OF THE INVENTION

The gases which are contained in the crankcase of a combustion engine contain a plurality of various particulate impurities. Since the crankcase is vented and thus in contact with the surrounding atmosphere, these particulate impurities would reach the surrounding atmosphere if the crankcase gas is not cleaned. The requirements from the authorities in this area are now increasing in many countries in order to prevent uncleaned crankcase gases from being discharged in an uncontrolled manner. A device providing such a cleaning and being of the type initially defined is disclosed in EP-A-1 273 335. By means of the rotating member, the gas may be given the kinetic energy that ensures an efficient separation of the particulate impurities from the gas. The rotating member provides a certain pump effect on the crankcase gas and will thus force the crankcase gas out of the crankcase. This known device is thus not dependent on the generation of a pressure in the crankcase for the discharge and cleaning of the crankcase gas. By means of a simple pressure regulator, the pressure that shall prevail in the crankcase and that varies in different combustion engines may be adjusted in an easy manner. It can however not be excluded that the gas also by means of such a rotating member will contain a small rest amount of particulate impurities in relation to the main amount.

Devices of similar kinds are disclosed in WO2004/001201 and WO2004/022239.

EP-A-685 635 discloses another kind of device for ventilation of the crankcase of a combustion engine. The device includes a separator for cleaning the crankcase gas leaving the crankcase and more precisely for separating oil from the crankcase gas. EP-A-685 635 proposes that the oil separator is designed as an electric filter. The purpose of this oil separator is to separate a main part of the oil that is contained in the crankcase gas. The electric filter of the oil separator may include one of several stages. Furthermore, it is defined in EP-A-685 635 that a further separator may be provided upstream the oil separator. This further separator is a coarse separator for separating a part the oil that is contained in the crankcase gas. The coarse separator may include different kinds of separators and EP-A-685 635 proposes cyclones, rebound separator of fibre separators. All these kinds of separators are passive in the sense that they requires that the gas proper has a certain pressure or a certain kinetic energy that can be used for the separation. A sufficient kinetic energy is however not available in all applications, which, for instance in an engine application, means that the crankcase gas has to be given kinetic energy by means of a pump or there like.

In many applications there are also heavy requirements saying that the separation equipment should be light and require a minimum of space. These requirements, which are especially expressed for motor vehicles, makes it more difficult to provide an efficient and complete separation of particulate impurities.

SUMMARY OF THE INVENTION

The object of the present invention is to provide a device for an efficient separation of particulate impurities from a gas. More specifically, it is aimed at an efficient separation of substantially all particulate impurities of different sizes and different kinds.

This object is achieved by means of the device initially defined, which is characterized in that it includes an additional separator, which is adapted to separate substantially the whole rest amount, wherein the additional separator includes an electrostatic filter.

The invention is thus realized by means of a combination of a rotating member and an electrostatic filter. By means of such a combination a very high degree of cleaning is achieved. The rotating member operates as a centrifuge which per se has a very high degree of separation, wherein merely a smaller rest amount needs to be taken care of by the electrostatic filter. Accordingly, practically all particulate impurities of various kinds and sizes, for instance solid particles, oil particles in the form of oil droplets or an oil mist, are removed from the gas to be cleaned. The cleaning may also be provided without the need to install any additional pressure generator. The energy required for forcing the gas to be cleaned through the device is provided by the rotating member. The additional separator defined may also be provided in or at the device without any significant increase of the weight or the size of the device.

According to an embodiment of the invention the electrostatic filter includes a first pole element, a second pole element, and a voltage unit, which provides an electric potential difference between the first pole element and the second pole element in such a way that the first pole element charges the particulate impurities in the gas with an electric potential in relation to the second pole element and that the second pole element attracts the charged particulate impurities for separating them from the gas. By such an additional separator, substantially the whole rest amount may in an easy and efficient manner be removed from the gas.

According to a further embodiment of the invention, the second pole element is provided downstream the first pole element. In such a way, the particulate impurities flowing through the device will in the first place obtain an electric charge and thereafter be attracted to the second pole element during their continuing flowing through the device.

According to a further embodiment of the invention, the second pole element is provided downstream the inlet. The first pole element may then advantageously be provided upstream or in the inlet. The second pole element may for instance be provided in the rotating member. It is also possible that at least one of the pole elements is provided in the rotating member.

According to a further embodiment of the invention, the rotating member includes a number of rotating separation discs which form one of the first pole element and the second pole element. For instance, the rotating separation discs may form the second pole element and thus be provided in such away that they exhibit said potential difference in relation to the first element.

According to a further embodiment of the invention, the rotating separation discs form the first pole element and are thus provided in such away that they exhibit said potential difference in relation to the second pole element. According to this embodiment, the rotating separation discs may thus have a positive potential and transfer an electric charge to the particulate impurities during their passage through the rotating member.

According to a further embodiment of the invention, the second pole element is provided downstream the rotating member. Also the first pole element may be provided downstream the rotating member. Furthermore, the second pole element may be provided downstream the outlet.

According to a further embodiment of the invention, the first pole element is provided downstream the outlet.

According to a further embodiment of the invention, the device includes a stationary housing, which defines a chamber in which the rotating member is provided, wherein the stationary housing has an inner wall which is arranged to catch the main amount that is separated by means of the rotating member and to convey the main amount to a discharge channel. Advantageously, the inner wall may then form the second pole element and be arranged to catch and convey also the rest amount to the discharge channel.

According to a further embodiment of the invention, the additional separator is provided in an integrated manner in the stationary housing.

According to a further embodiment of the invention, the device includes a pressure regulator for controlling the pressure of the gas. The pressure regulator may advantageously be provided in an integrated manner in the stationary housing. Furthermore, the second pole element may be provided in connection to the pressure regulator. Also the first pole element may be provided in connection to the pressure regulator.

According to a further embodiment of the invention, an electrically conducting plate is provided in a space immediately upstream the pressure regulator, wherein said plate forms one of the first and second pole elements. More specifically, a first electrically conducting plate and a second electrically conducting plate may advantageously be provided at a distance from and in parallel to each other in a space immediately upstream the pressure regulator, wherein the first plate forms the first pole element and the second plate the second pole element.

According to a further embodiment of the invention, the device is arranged to be mounted to a combustion engine for receiving and cleaning gas from a crankcase of the combustion engine.

According to a further embodiment of the invention, the device is arranged to be mounted to a machine tool for receiving and cleaning air from an area adjacent to the machine tool.

The object is also achieved by the method initially defined, which is characterized in that the gas is conveyed through an additional separator, which is adapted to separate substantially the whole rest amount, wherein the additional separator includes an electrostatic filter.

In an advantageous application of the methods the gas consists of crankcase gas from a crankcase of a combustion engine.

In another advantageous application of the method, the gas consists of air from an area adjacent to a machine tool.

The main separator may advantageously be arranged to remove substantially all particulate impurities down to a particle size of 2 µm, 1.5 µm, 1 µm or even 0.8 µm, wherein the electrostatic filter may remove substantially all remaining particulate impurities with a particle size from 0.5 µm to 1 µm. Furthermore, the main separator may be arranged to remove at least 98% of all particulate impurities in the gas.

BRIEF DESCRIPTION OF THE DRAWINGS

The invention is now to be explained more closely through a description of various embodiments and with reference to the drawings attached hereto.

DETAILED DESCRIPTION OF VARIOUS EMBODIMENTS OF THE INVENTION

Figure 1:
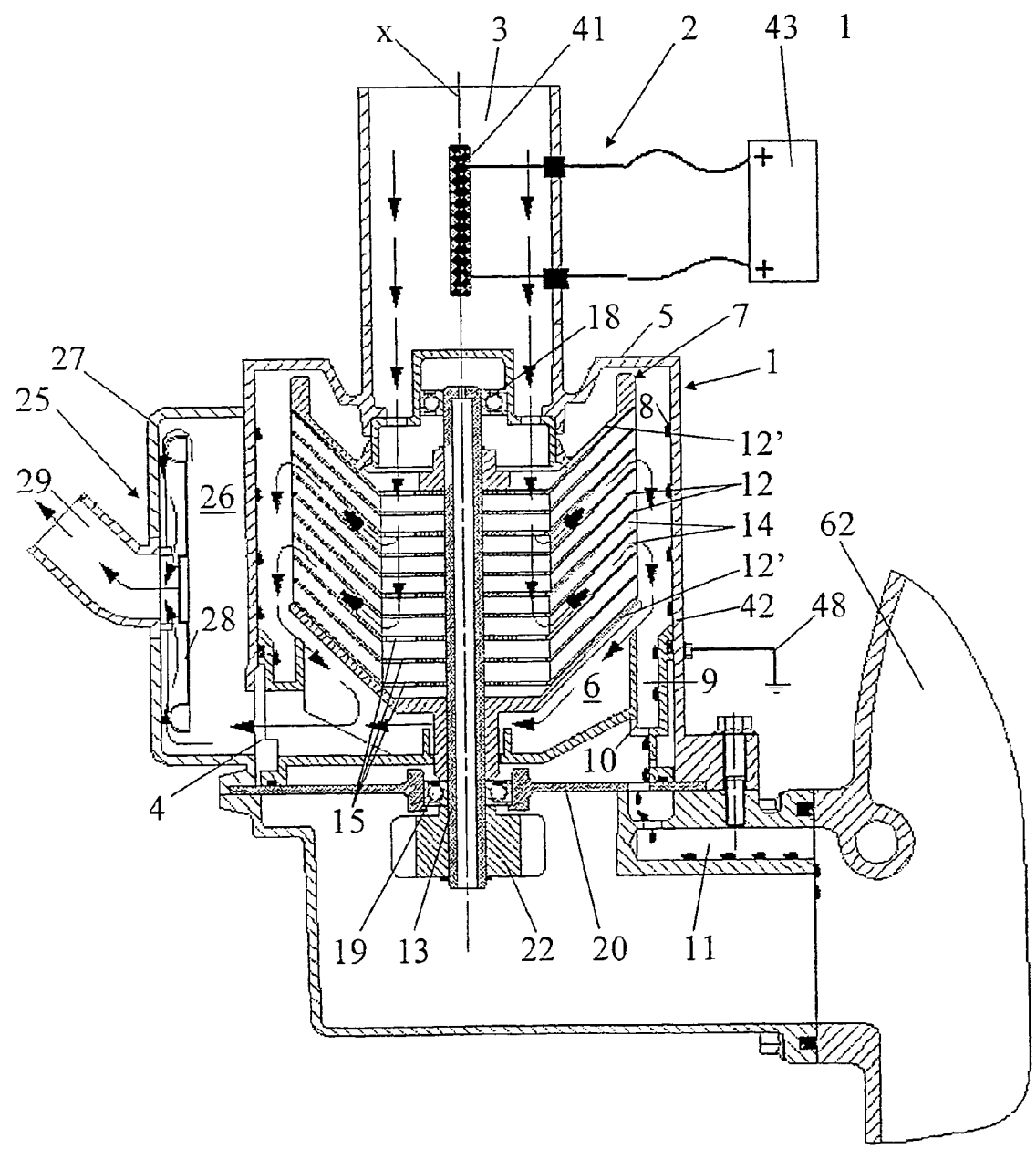
FIG. 1 discloses schematically a sectional view through a device according to a first embodiment of the invention FIG. 2 discloses schematically a sectional view through a device according to a second embodiment of the invention FIG. 3 discloses schematically a sectional view through a device according to a third embodiment of the invention FIG. 4 discloses schematically a view of a combustion engine having a device according to the invention FIG. 5 discloses schematically a view of a machine tool having a device according to the invention.
Figure 2:
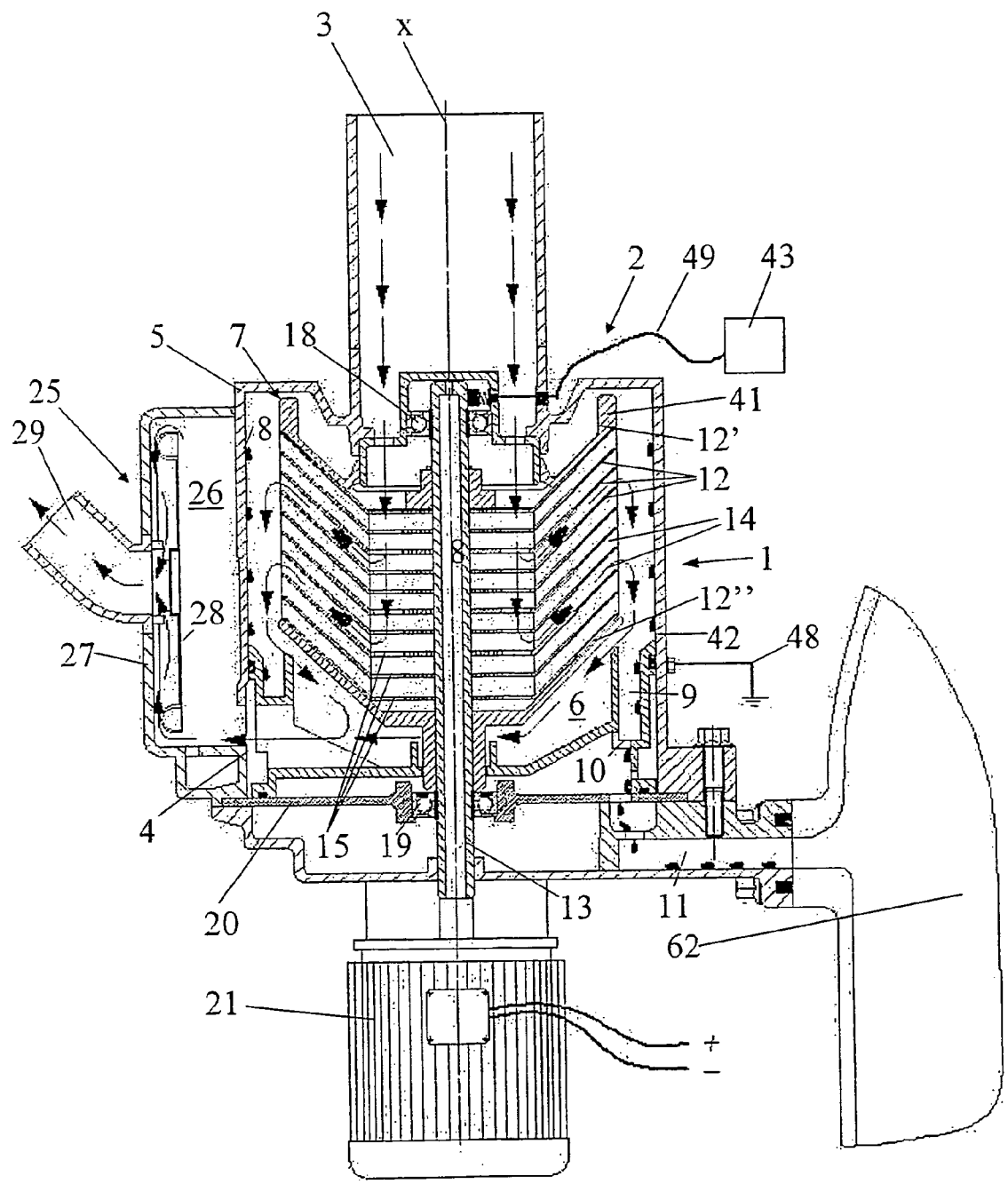
Figure 3:
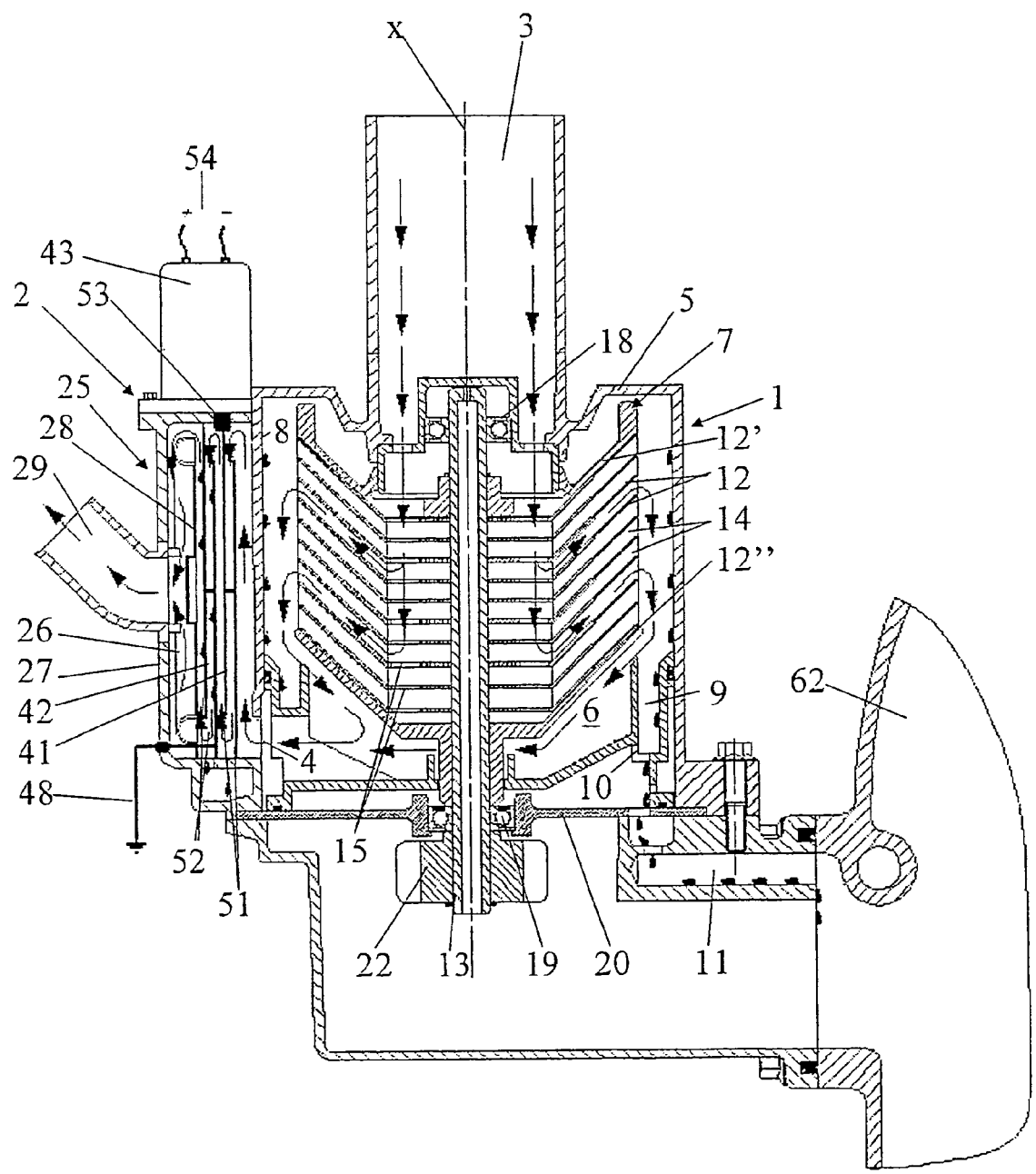

FIGS. 1-3 disclose various embodiments of a device for cleaning of a gas containing particulate impurities. The device includes a main separator 1 and an additional separator 2 in the form of an electrostatic filter to be described more closely below. The main separator 1 includes an inlet 3 for the gas to be cleaned and an outlet 4 for the gas. The device includes a stationary housing 5 which defines an inner chamber 6. The inlet 3 extends through the stationary housing 5 into the chamber 6. The outlet 4 extends from the chamber 4 through the stationary housing 5. The main separator 1 also includes a rotating member 7 which is provided in the chamber 6 between the inlet 3 and the outlet 4. The rotating member 7 is rotatable about a rotary axis x and designed as an open centrifuge rotor adapted to bring the gas from the inlet 3 in rotation for the separation of a main amount of the particulate impurities from the gas by means of centrifugal forces. The stationary housing 5 has an inner wall 8 that is arranged to catch the main amount which is separated by means of the rotating member 7. The separated particulate impurities may then flow downwardly along the inner wall 8 to a collecting channel 9 extending around the chamber 6 inside the inner wall 8 and having an outlet 10 to a discharge channel 11.

The rotating member 7 includes a number of rotating separation discs 12 which are attached to a rotor spindle 13. In the embodiments disclosed, the separation discs 12 are conical and concentrically provided on the rotor spindle 13. The separation discs 12 thus extend outwardly from the rotor spindle 13. It is to be noted that the separation discs 12 may extend obliquely upwardly, as in the embodiments disclosed, substantially radially outwardly or obliquely downwardly. It is also possible to let the rotating member 7 include axial separation discs extending in an axial direction and each having a axial inner edge connected to rotor spindle 13. Such axial separation discs may also extend either radially or for instance along a curve from the rotorspindel 13.

The rotating member 7 includes in the embodiments disclosed a plurality of conically separation discs 12, which between themselves form thin passages 14 for the through-flowing of the gas to be cleaned. The separation discs 12 are kept at a certain distance from each other by means of distance elements (not disclosed). This distance may for instance be in the order of 1 mm. The uppermost and the lowermost separation discs 12' and 12", respectively, are somewhat thicker then the remaining discs 12 and keep the stack of separation discs 12 together, for instance by means of axial rods (not disclosed) extending through all of the separation discs 12.

All separation discs 12 except for the lowermost one 12' have a plurality of through-going holes 15 that are distributed around the rotor spindle 13. These holes 15 and the passages 14 between the separation discs 12 form a central space in the rotating member 7. The central space communicates with the inlet 4 and the chamber 6. The central space thus forms a passage through the rotating member 7 for the gas to be cleaned.

The rotor spindle 13 is journalled in an upper bearing 18 which is fixedly mounted in the housing 5 and in a lower bearing 19 which is also fixedly mounted in the housing 5 via a bottom wall 20. The device also includes a drive member 21, 22 for driving the rotating member 7. The drive member 21, 22 may be designed in many different ways. In the second embodiment disclosed in FIG. 2, the drive member 21 is designed as an electrical motor that is directly connected to the rotorspindel 13 and provided beneath the lower bearing 19. In the embodiments disclosed in FIGS. 1 and 3, the drive member is designed as a rotor driven by means of a fluid jet, for instance an oil jet from a lubricating system of a combustion engine. An example of such a drive member is disclosed more closely in the initially mentioned WO2004/022239.

The device also includes a pressure regulator 25 for controlling the pressure of the gas. In the embodiments disclosed, the pressure regulator is provided substantially immediately downstream the outlet 4. More specifically, the pressure regulator 25 is provided in a space 26 which is located immediately outside the outlet 4 and which is limited by the stationary housing 5 and an outer wall 27. The outer wall 27 is advantageously fixedly connected to the stationary housing 5 in such away that the pressure regulator 25 forms an integrated part of the device and the stationary housing 5. It is to be noted however that within the scope of the invention, it is possible to provide the pressure regulator 25 in another position than the one disclosed in the three embodiments, for instance at a distance from the stationary housing 5. The pressure regulator 25 includes a movable membrane 28, which is provided immediately upstream a gas outlet channel 29 and which may move in the space between a position where the gas outlet channel 29 is open and a position where the gas outlet channel 29 is closed.

As mentioned above, the device also includes an additional separator 2 which is adapted to separate a rest amount of the particulate impurities remaining in the gas. The electrostatic filter of the additional separator 2 includes a first pole element 41 and a second pole element 42. Furthermore, there is a voltage unit 43 which provides a high electrical voltage, i.e. an electrical potential difference between the first pole element 41 and the second pole element 42. The pole elements 41 and 42 are provided in such away that they will be in contact with the gas flowing through the device. Thanks to the electrical potential difference between the first pole element 41 and the second pole element 42, the first pole element 41 will charge the particulate impurities in the gas with an electrical potential in relation to the second pole element 42. The second pole element 42 will attract the charged particulate impurities for separating said rest amount from the gas. In the embodiments disclosed, the second pole element 42 is provided substantially downstream the first pole element 41.

The pole elements 41 and 42 may be provided in many different positions in the device. The three embodiments disclose three different examples of possible locations of the pole elements 41 and 42. The three embodiments are now to be explained more closely with regard to the location and function of the pole elements 41, 42 with reference to FIGS. 1-3. Elements having a corresponding function have in the three embodiments been given the same reference signs.

FIG. 1 discloses a first element 41, which is provided in the inlet and upstream the second pole element 42. The first pole element 41 is in this embodiment designed as a net of an electrically conducting material such as conducting plastics or metal including aluminium, copper and/or iron. Such a net of a wire-shaped material offers a proper possibility to charge the particulate impurities flowing through the inlet 3. The first pole element 41 may also be designed as a thin wire of an electrically conducting material such as conducting plastics or metal. Such a wire may also extend in the inlet 3 in any suitable path. Furthermore, the first pole element 41 may be designed as one or several tips of an electrically conducting material projecting into the inlet 3. The first pole element 41 is connected to the voltage unit 43 which in the embodiment disclosed provides a positive electrical voltage. However, it is to be noted that the voltage unit 43 also may provide a negative electric voltage in order to give the particulate impurities a negative charge. The second pole element 42 is formed in the first embodiment in the first place by the inner wall 8 of the stationary housing 5. The second pole element 42 is provided by the fact that stationary housing 5 is connected to ground via a ground conduit 48. In the embodiment disclosed in FIG. 1 there is no electrical isolation between the stationary housing 5 and the rotating member 7. This means that also the rotating member 7 and the separation discs 12, as far as these are electrically conducting, will be connected to ground and thus provide a part of the second pole element 42. The separation discs 12 are advantageously manufactured in any light material, for instance plastics. If one wishes that the rotating member 7 shall form the second pole element 42 or a part of the second pole element 42, the separation discs are advantageously manufactured in an electrically conducting plastics. The separation discs 12 may of course in this case also be manufactured in any suitable metal. As appears from above, the separation discs 12 may be manufactured in a non-conducting material, preferably plastics, wherein the second pole element 42 substantially will be located downstream the rotating member 7. It is also possible to isolate electrically the rotating member 7 from the stationary housing 5, wherein the second pole element 42 may be provided completely downstream the rotating member 7. Examples of such an isolation of the rotating member 7 are indicated in the second embodiment in FIG. 2. In the first embodiment, the inner wall 8, and possibly also the separation discs 12, will thus attract the particulate impurities which have been given an electrical charge in the inlet 3 from the first pole element 41. In such a way it is ensured that possibly remaining particulate impurities will be drawn to the inner wall 8 from where they may be discharged together with the main amount. This separation by means of static electricity is very efficient with regard to particles having a low weight or small size, for instance particulate impurities having a particle size from 0.05 μm to 1 μm. Larger or heavier particulate impurities having a particle size, down to 0.8 μm will in an efficient manner be separated by the main separator, i.e. by means of the rotating member 7.

FIG. 2 discloses a second embodiment of the invention. In the second embodiment, the first pole element 41 is formed by the rotating member 7, which via the voltage unit 43 is given a positive electrical potential. The rotating member 7 is then connected to the voltage unit 43 via an electrical connection 49. The electrical connection 49 may for instance include a sliding contact. The second pole element 42 is formed also in the second embodiments by the stationary housing 5 an in particular the inner wall 8.

In the third embodiment disclosed in FIG. 3, both the first pole element 41 and the second pole element 42 are provided downstream the rotating member 7 and downstream the outlet 4. In this embodiment, both the pole elements 41 and 42 are provided in connection to the pressure regulator and more precisely in the space 26 immediately upstream the membrane 28. The first pole element 41 includes at least one electrically conducting plate 51 and in the example disclosed two electrically conducting plates 51, which are provided at a small distance from each other and in parallel to each other, i.e. the plates 51 have a substantially parallel extension. The second pole element 42 also includes at least one electrically conducting plate 52 and in the example disclosed two electrically conducting plates 52. Also these two plates 52 are provided at a small distance from each other and with a substantially parallel extension. Furthermore, the plates 51 are substantially parallel in relation to the plates 52. The gas flowing through this additional separator 2 is thus forced to flow in a reciprocating path through the space 26, which can be seen clearly in FIG. 3. The gas then flows first between one inner wall of the space 26 and the first plate 51, thereafter the gas turns and flows downwardly between the two first plates 51, whereafter the gas again turns upwardly and flows between one of the first plates 51 and the first second plate 52. Thereafter, the gas again flows downwardly between the two second plates 52. Thereafter the gas is distributed in the space 26 between the second plate 52 and the membrane 28, and flows passing the membrane 28 and out through the gas outlet channel 29. The electrostatic filter in the third embodiment also includes a voltage source 43 providing a high electrical voltage and being connected to the two first plates 51 via an electrical connection 53. FIG. 3 indicates a low voltage feed of the voltage source 43. The two second plates 52 are both connected to the ground via a ground connection 48.

It is to be noted that the housing 5 and/or the outer wall 27 may include an electrically conducting material, plastics or metal, wherein an electric shielding of the high voltage applied by the first pole element 41 in the chamber 6 or the space 26.

Figure 4:
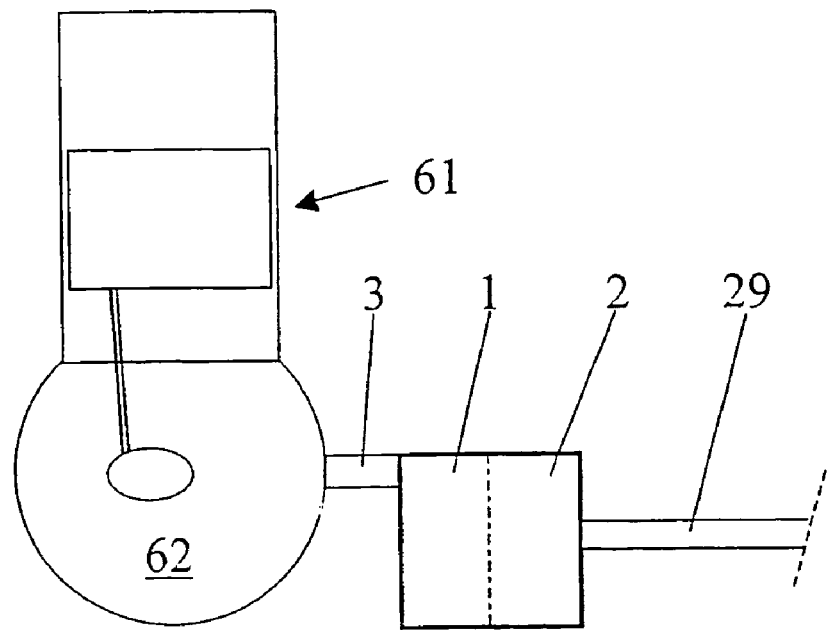

FIG. 4 indicates an advantageous application of the device according to the invention. The device is here intended to clean crankcase gases from a crankcase of a schematically disclosed combustion engine 61. In the inlet 3 is then connected to the crankcase 62 of the combustion engine 61. The crankcase gases are conveyed through the main separator 1 and the additional separator 2 and out through the gas outlet channel 29. The devices disclosed in FIGS. 1-3 are also mounted to a combustion engine 61, wherein the discharge channel 11 is arranged to re-circulate separated oil to the crankcase 62 of the combustion engine 61.

Figure 5:
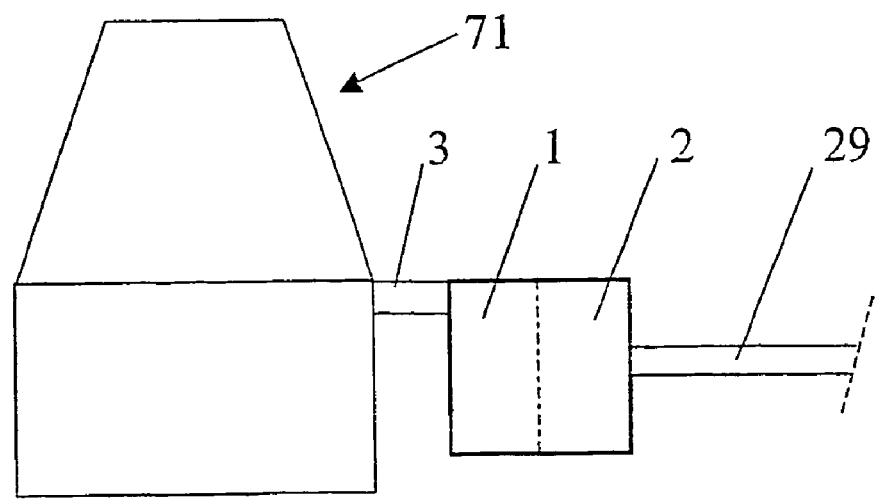

FIG. 5 discloses another advantageous application of the invention in a schematically disclosed machine tool 71 that is enclosed in a casing. Air inside the casing is conveyed out from the casing and into the inlet 3 of the device. From there the air to be cleaned is conveyed through the main separator 1 and the additional separator 2 and thereafter out through gas outlet channel 29.

The invention is not limited to the embodiments disclosed but may be varied and modified within the scope of the following claims.

What is claimed is:

1. A device for cleaning of a gas containing particulate impurities, the device being arranged to be mounted to a combustion engine for receiving and cleaning gas from a crankcase of the combustion engine;
   wherein the device includes a main separator having an inlet for the gas, an outlet for the gas and a rotating member which is arranged between the inlet and the outlet and includes a rotor spindle and a number of rotating separation discs attached to the rotor spindle wherein the rotating member is adapted to bring the gas to rotate for separating by means of centrifugal forces a main amount of the particulate impurities from the gas, wherein a remaining amount of the particulate impurities remains in the gas, and
   wherein the device includes an additional separator which is adapted to separate substantially the remaining amount, wherein the additional separator includes an electrostatic filter;
   wherein the electrostatic filter includes a first pole element, a second pole element, and a voltage unit, which provides an electric potential difference between the first pole element and the second pole element in such a way that the first pole element charges the particulate impurities in the gas with an electric potential in relation to the second pole element and that the second pole element attracts the charged particulate impurities for separating them from the gas.

2. A device according to claim 1, wherein the second pole element is provided downstream the first pole element.

3. A device according to claim 1 wherein the second pole element is provided downstream the inlet.

4. A device according to claim 3, wherein the second pole element is provided in the rotating member.

5. A device according to claim 1, wherein at least one of the pole elements is provided in the rotating member.

6. A device according to claim 5, wherein the rotating member includes a number of rotating separation discs which form one of the first pole element and the second pole element.

7. A device according to claim 6, wherein the rotating separation discs form the second pole element and thus are provided in such away that they exhibit said potential difference in relation to the first pole element.

8. A device according to claim 6, wherein the rotating separation discs form the first pole element and thus are provided in such away that they exhibit said potential difference in relation to the second pole element.

9. A device according to claim 1, wherein the second pole element is provided downstream the rotating member.

10. A device according to claim 1, wherein the first pole element is provided downstream the rotating member.

11. A device according to claim 1, wherein the second pole element is provided downstream the outlet.

12. A device according to claim 1, wherein the first pole element is provided downstream the outlet.

13. A device according to claim 1, wherein the device includes a stationary housing which defines a chamber in which the rotating member is provided, wherein the stationary housing has an inner wall which is arranged to catch the main amount that is separated by means of the rotating member and to convey the main amount to a discharge channel.

14. A device according to claim 9, wherein the device includes a stationary housing which defines a chamber in which the rotating member is provided, wherein the stationary housing has an inner wall which is arranged to catch the main amount that is separated by means of the rotating member and to convey the main amount to a discharge channel and wherein the inner wall forms the second pole element and is also arranged to catch and convey the remaining amount to the discharge channel.

15. A device according to claim 13, wherein the inner wall forms the second pole element and is also arranged to catch and convey the remaining amount to the discharge channel.

16. A device according to claim 13, wherein the additional separator is provided in an integrated manner in the stationary housing.

17. A device according to claim 1, wherein the device includes a pressure regulator for controlling the pressure of the gas.

18. A device according to claim 13, wherein a pressure regulator is provided in an integrated manner in the stationary housing.

19. A device according to claim 17, wherein the pressure regulator is provided in an integrated manner in the stationary housing.

20. A device according to claim 17, wherein a second pole element is provided in connection to the pressure regulator.

21. A device according to claim 18, wherein a second pole element is provided in connection to the pressure regulator.

22. A device according to claim 17, wherein a first pole element is provided in connection to the pressure regulator.

23. A device according to claim 17, wherein an electrically conducting plate is provided in a space immediately upstream the pressure regulator wherein said plate forms one of the first and second pole elements.

24. A device according to claim 17, wherein a first electrically conducting plate and a second electrically conducting plate are provided at a distance from and in parallel to each other in a space immediately upstream the pressure regulator wherein the first plate forms a first pole element and the second plate a second pole element.

25. A method for cleaning a gas consisting of crankcase gas from a crankcase of a combustion engine and containing particulate impurities, including the steps of:
supplying the gas to an inlet of a main separator,
rotating the gas by means of a rotating member of the main separator, which includes a rotor spindle and a number of rotating separation discs attached to the rotor spindle, wherein the rotating member by means of centrifugal forces separates a main amount of the particulate impurities from the gas, wherein a remaining amount of the particulate impurities remains in the gas, and
discharging the gas from the main separator via an outlet, wherein the gas is conveyed through an additional separator, which is adapted to separate substantially the whole remaining amount, wherein the additional separator includes an electrostatic filter which includes a first pole element, a second pole element, and a voltage unit;
the voltage unit providing an electric potential difference between the first pole element and the second pole element so that the first pole element charges the particulate impurities in the gas with an electric potential in relation to the second pole element and so that the second pole element attracts the charged particulate impurities thereby separating the particulate impurities from the gas.

26. A method according to claim 25, wherein the main separator is arranged to remove substantially all particulate impurities down to a particle size of 2μ.

27. A method according to claim 25, wherein the main separator is arranged to remove at least 98% of all particulate impurities from the gas.

28. A device for cleaning of a gas containing particulate impurities, the device being arranged to be mounted to a machine tool for receiving and cleaning air from an area adjacent to the machine tool;
wherein the device includes a main separator having an inlet for the gas, an outlet for the gas and a rotating member which is arranged between the inlet and the outlet and includes a rotor spindle and a number of rotating separation discs attached to the rotor spindle wherein the rotating member is adapted to bring the gas to rotate for separating by means of centrifugal forces a main amount of the particulate impurities from the gas, wherein a remaining amount of the particulate impurities remains in the gas;
wherein the device includes an additional separator which is adapted to separate substantially the remaining amount, wherein the additional separator includes an electrostatic filter; and
wherein the electrostatic filter includes a first pole element, a second pole element, and a voltage unit, which provides an electric potential difference between the first pole element and the second pole element in such a way that the first pole element charges the particulate impurities in the gas with an electric potential in relation to the second pole element and that the second pole element attracts the charged particulate impurities for separating them from the gas.

29. A method for cleaning a gas consisting of air from an area adjacent to a machine tool and containing particulate impurities, including the steps of:
supplying the gas to an inlet of a main separator,
rotating the gas by means of a rotating member of the main separator, which includes a rotor spindle and a number of rotating separation discs attached to the rotor spindle, wherein the rotating member by means of centrifugal forces separates a main amount of the particulate impurities from the gas, wherein a remaining amount of the particulate impurities remains in the gas, and
discharging the gas from the main separator via an outlet, wherein the gas is conveyed through an additional separator, which is adapted to separate substantially the whole remaining amount, wherein the additional separator includes an electrostatic filter which includes a first pole element, a second pole element, and a voltage unit; and
the voltage unit providing an electric potential difference between the first pole element and the second pole element so that the first pole element charges the particulate impurities in the gas with an electric potential in relation to the second pole element and so that the second pole element attracts the charged particulate impurities thereby separating the particulate impurities from the gas.

* * * * *